May 3, 1938.   R. R. CHAPPELL ET AL   2,116,142
REVERSING MECHANISM
Filed April 25, 1936   2 Sheets-Sheet 2
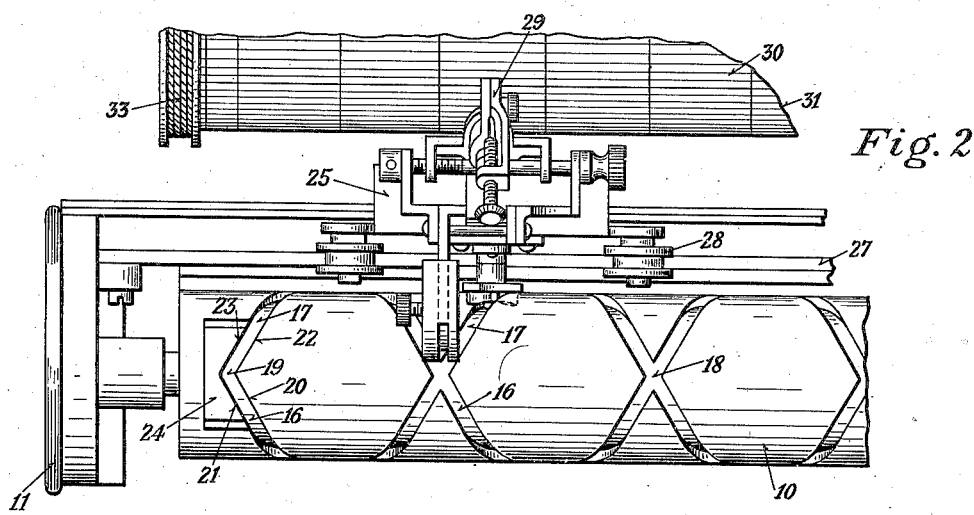
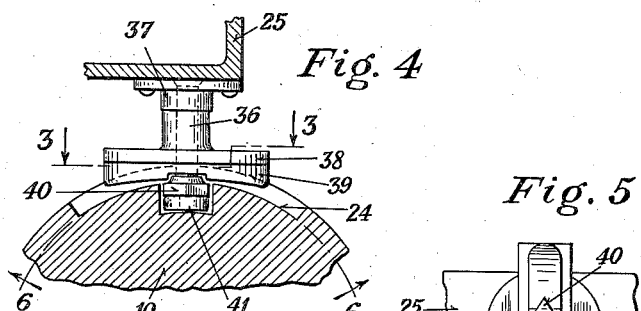
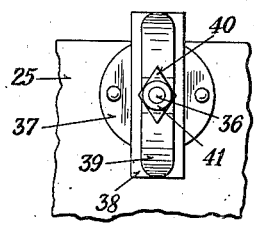
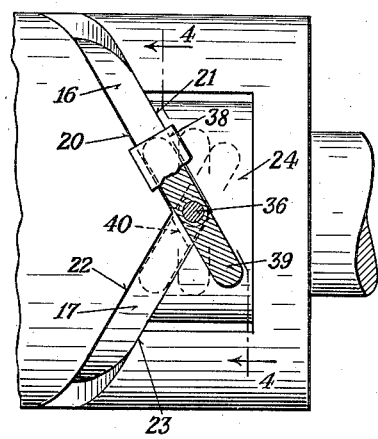
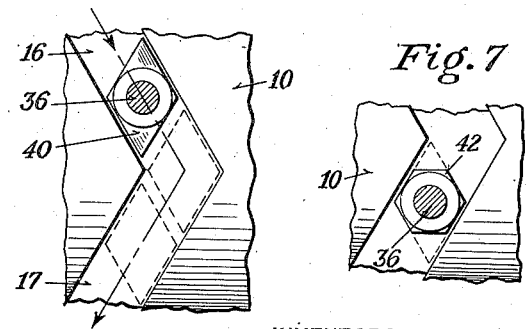
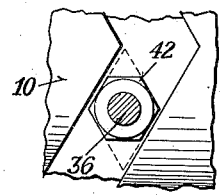
INVENTORS.
Ralph R. Chappell
Rutger B. Colt
BY Stephen Gerstvik
ATTORNEY.

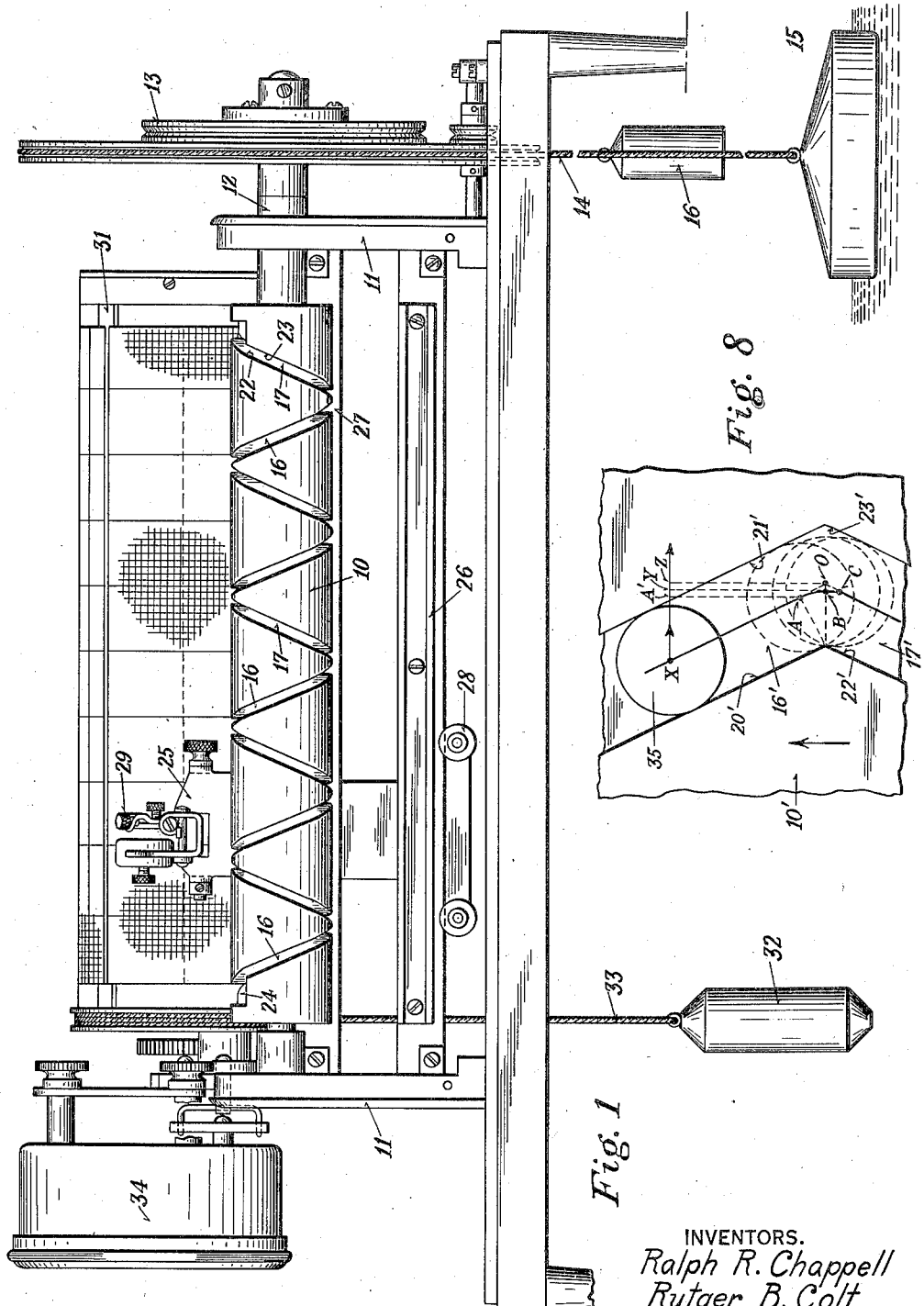

Patented May 3, 1938

2,116,142

UNITED STATES PATENT OFFICE 2,116,142

REVERSING MECHANISM

Ralph R. Chappell, Richmond, Va., and Rutger B. Colt, Baltimore, Md., assignors to Bendix Aviation Corporation, South Bend, Ind., a corporation of Delaware Application April 25, 1936, Serial No. 76,448

13 Claims. (Cl. 74—56)

This invention relates to a mechanical movement and more particularly to means designed to secure reciprocating movement of one part relative to another.

It has been heretofore proposed to produce reciprocatory movement by causing a movable part to follow the path of a groove in a cooperating part such, for example, as the axial reciprocation which may be secured through the reaction of a continuous or endless helical groove in the surface of a rotatable cylindrical member, as shown in Au Patent No. 1,645,273. In such prior apparatus, however, there has resulted a disturbance in the desired ratio of movement between the reciprocating and rotary parts at the point where the reversal of movement of the former occurs.

It is accordingly an object of the present invention to provide novel apparatus of the above character wherein a sharp, substantially instantaneous reversal in the movement of the reciprocating part is obtained.

Another object is to provide novel means for converting rotary movement into reciprocatory movement in a direction parallel to the axis of the rotating element whereby the ratio between said movements may be maintained constant throughout the entire range of movement of the reciprocating part.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference being primarily had for this latter purpose to the appended claims.

In the drawings, wherein like reference characters refer to like parts throughout the several views, Fig. 1 is a side elevation of one form of mechanism embodying the present invention;

Fig. 2 is a top plan on an enlarged scale and with parts broken away of the device of Fig. 1;

Fig. 3 is an enlarged top plan, partly in section and with parts broken away, showing the reciprocating member at the point of reversal, the section being taken substantially on line 3—3 of Fig. 4;

Fig. 4 is a section taken substantially on line 4—4 of Fig. 3, the guide means of the reciprocating part being seen in side elevation;

Fig. 5 is a bottom view of said guide means;

Fig. 6 is an enlarged detail view taken substantially on the arcuate line 6—6 of Fig. 4;

Fig. 7 is a similar view showing a modified form of the guide means; and,

Fig. 8 is a diagrammatic view illustrating the error which occurs in the operation of similar apparatus heretofore provided.

One embodiment of the present invention is illustrated in the drawings by way of example in the form of a device wherein a cylindrical member has an endless thread on the surface thereof, said thread being preferably formed by cutting right-hand and left-hand helical grooves in said surface, each of said grooves terminating at an intersection with the other and having an axial length substantially equal to the desired extent of the reciprocating movement. The endless groove thus formed is caused to coact with a member which is constrained to move in a straight line so that when the cylinder is rotated a reciprocating movement in a line parallel to the axis of the cylinder is imparted to said member. The pitch of both of the grooves is preferably the same and is determined by the desired ratio of movement between the rotary member and the reciprocating member associated therewith. If the axial length of the grooves is greater than one-half the pitch thereof, the same will intersect and cross each other. Means are provided on the reciprocating member to prevent shifting of the same from one groove into another at a point of crossing, and means are also provided for obtaining a reversal of the movement of said member at the end of the groove without disturbing the ratio of movement between the same and the cylinder.

For the purpose of illustration, the endless screw is shown as being rotatably driven by a weight and float in accordance with changes in a liquid level, but any suitable driving means, such as a motor, manual power, a clock, etc., may be employed. It will also be apparent that in some embodiments of the invention, the reciprocable element may be the driving member and the cylinder the driven member, and in others the reciprocating movement of a member, as the phrase is herein used, may constitute only one component of the true movement of that member. It will also be seen that the grooved surface may take other forms than a cylinder. The means to be reciprocated, as shown, comprises a carriage bearing a suitable recording style which is adapted to cooperate with a recording surface to print a graph indicative of the positions of said float and hence the liquid level, but it may take the form of any one of a great variety of elements to which it is desirable to impart reciprocating movement.

Referring now to the drawings and more particularly to Figs. 1 and 2, a drum or cylinder 10 is rotatably mounted in bearings on a pair of spaced supports 11 with the shaft 12 thereof extending through one of the supports and having a suitable pulley or wheel 13 keyed thereon. A cord or cable 14 is wound around said wheel and has a float 15 secured to one end thereof, said float resting upon the surface of a body of water, the stage of which is to be recorded. A weight 16 is secured to the other end of cable 14 for keeping the latter taut between the float and wheel 13 and for rotating the latter when the liquid level rises. The float and weight thus constitute one of the many suitable forms of driving means which may be employed for rotating cylinder 10, other forms of which will be apparent to those skilled in the art.

The surface of cylinder 10 has inscribed therein an endless thread comprising two grooves 16 and 17, one of which follows the course of a left-hand and the other of a right-hand screw thread, the pitches of the same being shown equal and uniform. The two grooves cross each other at points 18 (Fig. 2) and terminate at points of intersection 19 adjacent the ends of cylinder 10. The walls 20 and 21 of groove 16 continue at said latter points without change of pitch until intersected by walls 22 and 23, respectively, of groove 17, which also extend to the lines of intersection without change of pitch. The surface of cylinder 10 is milled out or cut away over a somewhat rectangular area 24 adjacent the ends of grooves 16, 17 but to a less depth than said grooves, as will be clearly seen in Fig. 4.

The carriage constituting the reciprocating element of the illustrated embodiment, which element, as heretofore pointed out, may assume various other forms, comprises a frame 25 that is constrained to move in a rectilinear path by a pair of vertically spaced tracks 26 and 27 supported by standards 11 and on which tracks said frame is movably mounted by means of four grooved wheels 28.

A recording style 29 is adjustably mounted on carriage 25 and adapted to engage a recording sheet 30 on drum 31. The latter may be rotated and the movement thereof controlled in any suitable manner by any of several common and well-known means for the purpose, such as by a weight 32 secured to cord 33 wound around one end of drum 31. The turning movement of the latter may be controlled by timing mechanism 34. The driving and control means for drum 31 as well as the drum itself, carriage 25 and style 29 may be of usual or any suitable or desired construction, and since the same do not per se form any part of the present invention, it is believed to be unnecessary to show and describe the same in further detail.

Heretofore in apparatus of the general character of the present invention, the carriage or other reciprocable part has been provided with a roller which coacts with the walls of the grooves or threads on the rotating member for securing the desired movement. In such apparatus, however, the ratio of movement between the reciprocating and rotating parts is disturbed when said reciprocating part is near the limits of its movement, i. e. near the ends 19 of grooves 16 and 17. The error which occurs in the operation of such apparatus is illustrated in Fig. 8 wherein it appears that the center of a roller 35 or other guide member travels along a path ABC rather than along the ideal path AOC.

For the purpose of analysis, let us consider roller 35 as moving in groove 16' with the same forces acting thereon that would be acting if the grooved member 10' were moving in the direction of the single-headed arrow. Under these conditions, the pressure and reaction thereto would occur between wall 20' of the groove and the surface of the roller, and the center of the latter would follow the path XA. When the position A is reached, the only pressure exerted and reaction thereto would still occur between the roller and wall 20' so that the center of the roller would follow an arcuate path AB having a radius equal to that of the roller. When the roller has reached point B, it will be seen that no force will be exerted thereon by the member 10' until wall 23' of groove 17' moves into contact therewith or, in other words, the roller would, in actual operation, remain stationary while the driving element 10' moves a distance represented by the straight line CB.

Accordingly, when roller 35 is constrained to move in a straight line XZ, it will be apparent that during the reciprocating movement thereof from A' to Y, the ratio of such movement to the movement of member 10' in the direction of the arrow varies greatly, i. e. from the normal desired value to zero. Additionally, the direction of movement of the reciprocating part 35 is reversed at Y after an interval of rest instead of traveling to point Z. This error may of course be reduced by decreasing the size of the roller, but the same cannot be eliminated when pressure on the roller is depended upon at the point of reversal.

Novel means are accordingly provided whereby a desired ratio of movement between the reciprocating and rotating members is never disturbed and the reversal of movement of the element to be reciprocated is substantially instantaneous. Such means as shown are constituted by a part of carriage 25 and comprise a bolt or spindle 36 which is supported on frame 25 by means of a flanged collar 37 and extends downwardly therefrom, as viewed in Fig. 4, to a point adjacent the bottom of thread or grooves 16, 17.

Loosely mounted on pin 36 adjacent collar 37 is an elongated boat or guide member having an upper flange 38 and a depending portion 39, the width of the latter being slightly less than that of grooves 16, 17. Said depending portion 39 projects into the groove to an extent such that the curved lower face thereof will clear the surface of milled spaces 24 at each end of cylinder 10 and permit the ends of the boat to swing about pin 36 in said spaces during the reversal of movement of the pin. Said guide or boat is sufficiently long to bridge the crossing groove at points 18 when pin 36 is moving past one of said points to thereby prevent said pin from shifting from one groove into another. The above is the sole purpose of guides 38, 39, the same having no effect whatever on the reversal of movement of pin 36 at the points 19.

Also mounted on pin 36, either loosely or rigidly, is a reversing guide 40 which, in the form shown in Fig. 6, is diamond shaped, with two opposed sides parallel to walls 20, 21 of groove 16 and the other two sides parallel to walls 22, 23 of groove 17. The perpendicular distance between each pair of said parallel sides is preferably slightly less than the width of grooves 16, 17. As best seen in Fig. 4, member 40 is preferably mounted on pin 36 so as to occupy a position in grooves 16, 17 below the surface of area 24.

In order to minimize the force required to be exerted by cylinder 10 or other movable member to impart rectilinear movement to carriage 25, a roller 41, having a diameter substantially the same as the width of grooves 16, 17, is rotatably mounted on the lower end of pin 36. A working clearance is of course allowed for said roller, and such clearance is preferably less than the working clearance allowed for member 40 so that the only friction between the rotatable and reciprocating parts except as will appear hereafter will be a rolling friction.

In operation, as cylinder 10 is rotated, carriage 25 is moved in a straight line parallel to the axis of the cylinder, i. e. along tracks 26, 27, by the coaction of groove 16, for example, and roller 41. When roller 41 reaches a point of intersection 18, guide 38 is operative to effectively bridge groove 17 so that said roller will continue in groove 16 until it reaches point 19 at one end of said groove. Member 40 will also perform this same function. When the center of roller 41 reaches a point in groove 16 corresponding to point A of Fig. 8, the pressure being exerted by wall 20 of groove 16 will be shifted from the roller to the trailing portion of the side wall of guide 40, thereby causing pin 36 to continue its rectilinear movement without any change in the ratio of said movement to the movement of cylinder 10. At substantially the same instant that wall 20 ceases to engage the side of member 40, roller 41 will be engaged by wall 23 of groove 17, thereby instantly reversing the direction of movement of carriage 25 without any disturbance in the ratio of movements. When, and only when, the point of reversal, 19 is reached, guide boat 38, 39 will be caused to swing by contact with the intersections of walls 20 and 22 into the dotted line positions of Fig. 3 as roller 41 and member 40 start to move along the center line of groove 17. It will be noted that if member 40 were not provided, boat 38, 39 would start swinging when the roller reaches point A (Fig. 8) and gradually assume its new position in line with groove 17, said new position being reached only after the roller has moved past point C.

In the modification shown in Fig. 7, the leading and trailing points of the diamond shaped reversing guide are removed, thus leaving a hexagonal guide member 42. The latter may also assume other shapes, it being necessary only that the relatively short operative portions of the parallel sides thereof be retained.

There is thus provided novel means for securing reciprocating movement of a propelled part by causing the same to coact with a cam surface on a driving part, whereby a constant ratio between the movement of the driving and driven parts may be maintained throughout the range of movement of the latter. Only one embodiment of the invention has been illustrated and described in detail, but it is to be expressly understood that the same is not limited thereto. For example, a flat reciprocating plate having grooves therein may be employed as the driving part to produce reciprocating movement of a driven part in a direction at right angles to its own direction of movement. Various other changes, many of which are suggested in the foregoing description, as well as changes in the design and arrangement of parts illustrated, may also be made without departing from the spirit and scope of the invention, as will now be apparent to those skilled in the art. For a definition of the limits of the invention, reference will be had primarily to the appended claims.

What is claimed is:

1. In apparatus of the class described, a rotatably mounted cylindrical member having an endless thread thereon constituted by two reversely directed helical grooves, an element movable in a line parallel to the axis of rotation of said member and having a portion projecting into said thread, and guide means on said projecting portion provided with a rectilinear portion adapted to engage the walls of said grooves whereby the reversal of movement of said element at the point of juncture of the grooves is obtained without disturbing the ratio of movement between said cylindrical member and said element.

2. In apparatus of the class described, a rotatably mounted cylindrical member having an endless thread thereon constituted by two reversely directed helical grooves, an element movable in a line parallel to the axis of rotation of said member and having a portion projecting into said thread, a roller on said projecting portion having a diameter slightly less than the width of said grooves, and a polygonal guide member on said projecting portion having sides parallel to the walls of each of said grooves at the point of juncture of the latter.

3. In apparatus of the class described, a rotatably mounted cylindrical member having an endless thread thereon constituted by two reversely directed helical grooves, an element movable in a line parallel to the axis of rotation of said member and having a portion projecting into said thread, and a polygonal guide member on said projecting portion having sides parallel to and engageable with the walls of each of said grooves adjacent the point of juncture of the latter.

4. In apparatus of the class described, a rotatably mounted cylindrical member having an endless thread thereon constituted by two reversely directed helical grooves, an element movable in a line parallel to the axis of rotation of said member and having a portion projecting into said thread, and polygonal guide means on said projecting portion to guide said portion from one of said grooves into the other at the juncture of said grooves without relative angular movement between said projecting portion and guide means.

5. In apparatus of the class described, a rotatably mounted cylindrical member having an endless thread thereon constituted by two reversely directed helical grooves, an element movable in a line parallel to the axis of rotation of said member and having a portion projecting into said thread, a roller on said projecting portion having a diameter slightly less than the width of said grooves, a guide having a length greater than the width of said grooves revolvably mounted on said projecting portion and entering said thread to only a portion of the depth thereof, said cylinder having a cut-away portion to permit turning of said guide from one groove into the other adjacent the point of juncture of said grooves, and a polygonal guide member on said projecting portion having sides parallel to and engageable with the walls of each of said grooves adjacent the point of juncture of the latter.

6. In combination, a reversely threaded rotatably mounted cylinder, the reverse threads of which terminate at an intersection thereof without change of pitch, a member movable linearly in a line parallel to the axis of said cylinder when the latter is rotated, and an element mounted on said movable member having two pairs of parallel sides engageable with the walls of said reverse threads.

7. In combination, a member having grooves therein which join at an intersection thereof, means for moving said member, an element extending into said grooves and adapted to be moved relative to said member by force exerted by the walls of said grooves, and a guide on said element having two sides thereof parallel to the walls of one of said grooves and two sides parallel to the walls of the other of said grooves, the perpendicular distance between said parallel sides being slightly less than the width of said grooves.

8. The combination of a rotatable member, an endless cam groove in the peripheral surface of said member, said groove having a sharp angular turn therein, an element adapted to move in a line parallel to the axis of rotation of said member, and rectilinear guide means on said element coacting with said cam groove during rotation of said member, the center of said guide means thereby being constrained to continuously follow the center line of said grooves.

9. In apparatus wherein an element is adapted to be reciprocated by coaction with a sharp angular groove in a member movable relative thereto, the combination with said element and member of a straight-sided polygonal guide member mounted thereon and extending into said groove, said guide member having two sides thereof in substantial engagement with the walls of said groove at all times, whereby the ratio between the movements of said element and relatively movable member may be maintained constant.

10. In a device of the class described, a member having a groove thereon forming a path in one direction, a sharp bend in said groove whereby said groove forms a path in a second direction, and an element projecting into said groove, comprising means guiding said element continuously in the direction of the first path until said second path is completely entered by said element.

11. In a device of the class described, a rotatable member, a member movable in a line parallel to the axis of rotation of said rotatable member, two reversely directed helical grooves on one of said members and a portion on the other of said members projecting into said grooves, guide means on said projecting portion adapted to engage the walls of said grooves whereby the reversal of movement of said element at the point of juncture of the grooves is obtained without changing the ratio of movement between said cylindrical member and said element.

12. In a device of the character described, a rotatable element, an element movable in a line parallel to the axis of rotation of said rotatable element, means on one of said elements constituting two reversely directed helical walls, and a portion on the other of said elements abutting said walls, comprising rectilinear guide means whereby said other element is projected in the direction of one of said walls until it abuts the other of said walls.

13. In a device of the class described, a member having a groove therein forming a path in one direction, a sharp bend in said groove whereby said groove forms a path in a second direction, an element projecting into said groove, means on said element providing rolling friction between said element and groove, and means whereby said rolling friction is changed to sliding friction in proximity to said bend whereby the ratio of movement between said grooved member and said element is maintained constant throughout the movement of said element.

RALPH R. CHAPPELL.
RUTGER B. COLT.